July 16, 1940.  H. J. MURRAY  2,208,224

POWER TRANSMISSION TORQUE CONVERTING DEVICE

Filed April 6, 1939

INVENTOR

Howard J. Murray.

Patented July 16, 1940

2,208,224

UNITED STATES PATENT OFFICE 2,208,224

POWER TRANSMISSION TORQUE CONVERTING DEVICE

Howard J. Murray, New York, N. Y.

Application April 6, 1939, Serial No. 266,248

24 Claims. (Cl. 74—293)

The present invention relates in general to an automatic torque converting power transmission mechanism, and specifically relates to a device for effecting and affecting universal drive relation between driving and driven members of a power transmission device.

One of the objects of the present invention is to provide a simple form of mechanism arranged to derive torque converting control power from the driving member and thence automatically employ the derived control power so as to effect and affect the driving relation of the mechanism members.

A further object of the present invention is to provide an automatic speed drive transmission mechanism with the parts arranged so as to be automatically controlled in its universal speed torque drive relations by hydraulic control elements deriving control power from one of the members according to the relative movement of the members.

An additional object of the present invention is to employ a hydraulic control means so as to effect the transmission of power from a driving member to a driven member under such conditions that the speed of the driven member may be automatically varied to acquire a proper speed-torque relation with the driving member.

A still further object of the present invention is to provide a combination of drive control elements which will be relatively stationary when the driving and driven members are operating at a prefixed speed ratio under normal load conditions.

A still additional object of the present invention is to provide a self acting couple including self-energizing elements arranged to be automatically retarded so as to effect drive relations of the couple as a function of such retardation.

The invention also contemplates the use of a self retarded hydraulic control couple in turn remotely controlled under such conditions that the speed of the driven member may be additionally manually varied so as to acquire speed-torque drive relations with the driven member.

The present invention is a development of the disclosures included in my U. S. Patents, Serial Nos. 2,143,709, 2,143,710 and 2,143,711, issued January 10, 1939. Also in my U. S. patent applications, Serial No. 66,876 filed March 3, 1936; No. 75,768 filed April 22, 1936; and No. 200,821 filed April 8, 1936.

While the present invention is obviously capable of use in any location wherein it is desired to transmit power at variable speed from one member to another, the present invention is particularly applicable to a variable speed power transmission device for use in connection with self-propelled vehicle construction, and it is in this connection that an embodiment of the present invention will be described in detail.

Reference to Patents Nos. 2,143,709 and 2,143,710 will show that non-slip drive relations between the driven and driving members are effected by resilient mechanical elements mounted for rotation about a common axis with the driving and driven members. Patent No. 2,143,711 also discloses a resilient mechanical means for effecting non-slip drive relations, but mounted for rotation about a separate axis.

In addition the mechanical normally non-slip-drive means disclosed in Patents No. 2,143,709 and No. 2,143,710 are intermittently moved into slip-drive operation and cause intermittent frictional contacts to exist during such drive operation.

Accordingly the present disclosure includes hydraulic torque converting means for effecting a non-slip drive relation during periods of normal torque, and the same hydraulic means is arranged to permit slip-drive operation during periods of excessive torque without mechanical friction or mechanical shocks.

In one embodiment of the present invention the hydraulic elements of a slip-drive couple are arranged to effect universal (under and over) speed drive relations, and in another embodiment the slip-drive couple may only effect any under speed to a direct drive relation.

According to the present disclosure the hydraulic control losses are very small compared to the total power transmitted from the driving member to the driven member during slip-drive and non-slip-drive operation. During non-slip-drive operation the loss is reduced to a minimum and is represented by the power required to create the static driving pressure in the liquid employed, during slip-drive periods this loss is increased by the molecular friction of the liquid employed.

In the following description and in the claims, parts will be identified by specific names for convenience of expression, but they are intended to be as generic in their application to similar parts as the art will permit.

Figure 1:
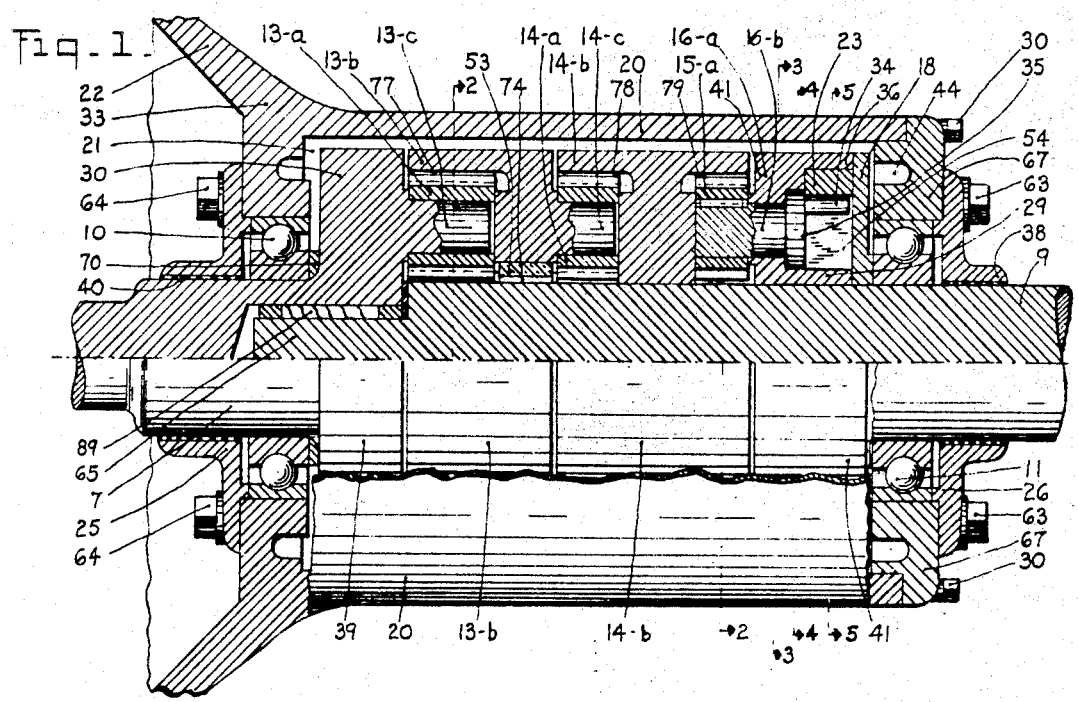
Figure 1 is an embodiment of the present invention partly in vertical section taken axially of the main shaft.

There is shown by Figure 1 of the drawing a novel variable slip-drive couple and associated transmission elements constituting collectively an automatic speed transmission mechanism and including a pair of power shafts 7 and 9 disposed in axial alignment with their adjacent ends including the reduced portion 65 of the shaft 9 interfitted with the bearing 89 to provide proper bearing surfaces.

The power shafts 7 and 9 are mounted for independent rotary movement respectively in suitable bearings 10 and 11. While either of these power shafts 7 and 9 may be considered as the driving member of the mechanism, for the purpose of this description, it will be considered that the shaft 7 is the normal driving member, and is operatively connected to be driven from a source of power (not shown) such as an internal combusting engine.

Accordingly shaft 9 is regarded as the normal driven member, and is operatively connected to whatever mechanism (not shown) it is desired to drive.

Figure 2:
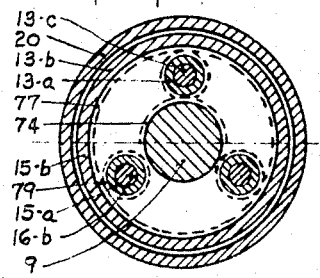
Figure 2 is a transverse sectional view taken approximately upon the line 2—2 of Figure 1, looking in the direction indicated by the arrows.

The shaft 9 is preferably made of a good quality of steel formed with teeth or splines 74 to operatively receive a plurality of groups of planet gears 13—a and 14—a (see Figure 2) forming together with the annular gears 13—b and 14—b and the sun teeth 74, a plurality of differential speed drive sets all connected in speed driving relation with the driven member 9. One of the sets (see left hand end set) in driving relation with the driving member 7.

The planet gears 13—a and 14—a are rotatably supported and positioned by the bearing portions 13—c and 14—c of the annular gears 13—b and 14—b so as to be constantly in mesh with the sun teeth 74, and to revolve and rotate therewith. The outer or annular gear 13—b is positioned and supported on the splined bearing 53 in turned positioned and supported by the teeth or splines 74 of the member 9. The annular gear 14—b may be directly supported in a conventional manner on the shaft 9.

With this arrangement it is evident that each planet gear is constantly in mesh with portions of the sun teeth 74 and the teeth 77 and 78 of one of the annular gears.

In passing it should be noted that the teeth 74 forming portions of the normally driven shaft 9 are in reality sun gears to be considered as an integral member for the purpose of this description, and that each sun portion is a part of a differential gear set. It is evident that a plurality of separate sun gears could be assembled on the driven shaft 9.

In this event it is obvious that power may be transmitted by and between the power members 7 and 9 through a plurality of power transmission paths and that each of these paths will act as a means to transmit power in some proportion to the retardation of the rotation of the said differential sets. It is also evident that any retardation of the rotation of the annular gear 14—b will be transmitted through planet gears 14—a to annular gear 13—b.

The annular gear member 14—b is also formed with a second set of annular teeth 79. Thus, any retardation applied to the teeth 79 will be transmitted to the annular gear teeth 77.

A splined member 41 is positioned on the member 9 by means of the key 31 to rotate therewith. The member 41 is formed with an axially extending flanged portion 36 to which an end member 18 is securely fastened so as to rotate therewith and form together with the web portions 45—a, 45—b and 45—c of member 41, a plurality of fluid enclosures (see Figure 5).

Figure 3:
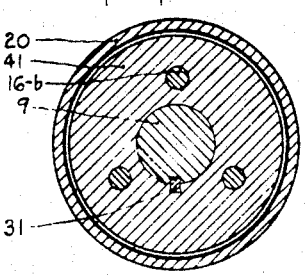
Figure 3 is a transverse sectional view taken approximately upon the line 3—3 looking in the direction indicated by the arrows.

A plurality of shafts 16—b (see Figure 3) extend axially through the walls of the member 41 to provide supports for the gears 15—a constantly in mesh with the annular teeth 79 of the gear member 14—b.

The shafts 16—b are formed at one end with an enlarged circular portion 35 arranged to receive the off-set pins 34 so that the said pins rotate about the axis of the shafts 16—b.

A plurality of slidable members 54—a, 54—b and 54—c are formed to slide back and forth around the axis of the shaft 16—b on the bearing surfaces of the enclosures including the curved surface of the axially extending flanged portion 29 of the member 41. The shiftable members 54—a, 54—b and 54—c are formed with radially extending slots 55 to receive the pins 34.

The web portions 45—a, 45—b and 45—c are formed with fluid conducting ducts 83, 84 and 85 into which are inserted relief valves 83—a, 84—a and 85—a for operation as hereinafter described.

Figure 4:
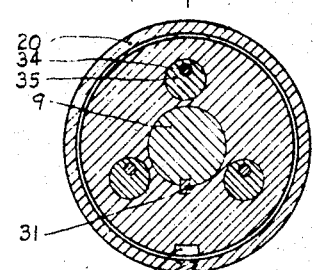
Figure 4 is a transverse sectional view taken approximately upon the line 4—4 looking in the direction indicated by the arrows.
Figure 6:
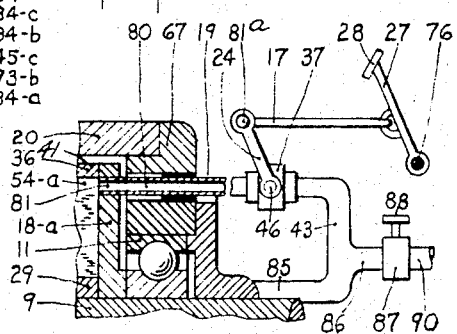
Figure 6 is an embodiment of my invention showing a modification in vertical section, taken axially along the main shafts of same.

In Figure 6 there is shown a modification of the means of Figure 1 in which the member 41 is attached to the stationary transmission casing 20 instead of the shaft 9, by moving the screw 76 into the locking slot 42 (see Figure 4) and securing the nut 75. The key 31 (see Figure 4) is removed, and the member 9 thus rotates free of the member 41.

In this modification the liquid held in the enclosures of the member 41 is conducted by means of the pipes 80 and 85 to the outside of the transmission casing and through the valve 37 and the cooling pipe portion 43.

The valve rod 46 of the valve 37 is connected to the rod 17 by means of the arm 24 and the connection 81a. The rod 17 is connected to the lever 27 having the foot pedal 28 and operatively fastened to the shaft 76 to move therewith. The shaft 76 is operatively connected to the vehicle brake or fuel supply mechanism (not shown) of the vehicle (not shown).

In operation, let it be assumed that the source of motive power (not shown) is connected to the normally driving member 7 of Figure 1 by means of the conventional foot clutch as commonly found on self-propelled vehicles, although it is possible according to the present disclosure to operate a vehicle equipped with the present device without any foot clutch.

Let it be further assumed for the purpose of this description that the source of power when connected to the member 7 will rotate the same clock-wise when viewed from the left end of Figure 1. The device to be driven, such as an automotive vehicle, is assumed to be connected to the normally driven shaft 9 through a conventional reversing unit (not shown) and that the shaft 9 is normally driven in the same direction as the driving shaft 7.

The transmission casing including the portions 20 and 67 is well filled with a good suitable lubricant, prevented from leaking out by end retainer flanges 25 and 26 secured to the casing by means of the bolts 63 and 64 and formed to receiving oil retaining material 38 and 40.

The enclosures 91—a, 91—b, 92—a, 92—b, 93—a and 93—b are filled with the selected fluid before the end member 18 is secured to the member 41.

With the shaft 7 rotating and the shaft 9 at rest, the planet gears 13—a and 14—b will be rotated clock-wise about their bearings 13—c and 14—c as they revolve about the shaft 9 due to their driving relation with the teeth 74 because the shafts 7 and 9 have a difference of speed. The annular gears 13—b and 14—b will also move clock-wise on the same direction as the rotation of the driving shaft 7.

As hereinbefore stated the present disclosure is a development of the invention disclosed in my co-pending application, Serial No. 66,876, filed March 3, 1936. The arrangement of the planet gears, annular gears and sun teeth are alike in both applications. Likewise the speed driving relations and the methods of obtaining universal speed drive relations is completely disclosed in the above noted application except rotatable dynamo-electric control couple elements are shown in place of the fluid control couple elements of the present disclosure.

It is obvious that no additional teaching will be obtained by duplicating such teaching in this application, insofar as the differential speed drive relations of the gears are concerned.

The means of Figure 1 may be assembled in several ways. It is suggested that the members 13—b, 14—b and 41 be assembled on the shaft 9 together with the elements they support. The member 7 is positioned in the casing portion 33 by means of the bearing 10, the spacer 70 and the flanged member 25. The gears 13—a are then assembled on the member 7 and the bearing member 89 inserted. The member 9 is then inserted in the bearing member 89, the bearing 11 mounted in the end member 67 with the flanged member 26. The end member 67 is then attached to the casing 20 by means of the bolts 30.

Thus, the teeth 79 of the annular gear 14—b will rotate the planet gears 15—a clock-wise to turn the shaft 16—b clock-wise to turn the end portion 35 and thus the pin 34 clock-wise about the axis of the shaft 16—b.

The pins 34 moving clock-wise in the slots 55 will act to move the slidable members 54—a, 54—b and 54—c back and forth in a reciprocating manner about the axis of the shaft 16—b.

The gears 15—a are preferably set so that the pins are 120° apart in angular relation so as to balance the effect of the reciprocating motion of the members 54—a, 54—b and 54—c and for other reasons hereinafter described.

It will be noted that a differential speed relation between the members 7 and 9 will be maintained. If the members 7 and 9 rotate at the same speed, the members 13—b and 14—b and 41 and associated elements will rotate about the axis of the shaft 9 at the same speed. If the member 9 rotates at a lower speed than the member 7, then the members 13—b and 14—b must assume relative speeds in order to maintain the differential relation.

As the speeds of the members 7 and 9 vary, the relative speeds of the members 14—b and 41 (keyed to the member 9) vary in definite differential relation to such variation. Thus, the rate or frequency of the reciprocatory movement of the members 54—a, 54—b and 54—c will vary as a function of the difference in speed of the members 7 and 9.

Now let it be assumed that the engine upon the vehicle has been started, and that the conventional foot clutch is "out." Let it be further assumed that the liquid enclosures formed in the member 41 have been filled with the selected control liquid, and that the means of Figure 1 within the casing is suitably submerged in a lubricating liquid. If the said conventional clutch (not shown) is let "in," the member 7 will be given a clock-wise rotation, and will tend to rotate the normally driven member 9 through the differential sets of Figure 1.

But if the member 9 is connected to the vehicle, a load resistance will be offered against its rotation, and thus the member 9 under normal conditions will remain at rest. Thus, the members 13—b, 14—b and 41 must rotate clock-wise to maintain a differential relation as hereinbefore stated, and if sufficient resistance is offered by the vehicle, the members 44—a, 54—b and 54—c will be given a reciprocating movement.

It should be noted that the fluid compressing means of member 41 is not a friction device. The contacting and guiding surfaces of the axially extending portions 29 and 36 may be smooth and made of steel. The same applies to the members 54—a, 54—b and 54—c, and in addition the surfaces are continually covered and thus lubricated with the fluid contained in the enclosures.

When the member 54—c moves toward the web portion 45—b, the liquid in the enclosure 93—a between these members will be compressed and its pressure against the walls of the enclosure will rise.

With the member 7 rotating and the member 9 held stationary by its connected load (the vehicle), the members (as 54—c) will reciprocate to compress the fluid in the enclosures. Thus, the pressure of the said liquid will increase.

The relief valve elements 83—a, 84—a and 85—a will not be operated for normal pressure, but will be moved against the seating springs 83—b, 84—b and 83—c positioned by the adjusting screws 83—c, 84—c and 85—c when the fluid compression increases beyond a predetermined value.

Figure 5:
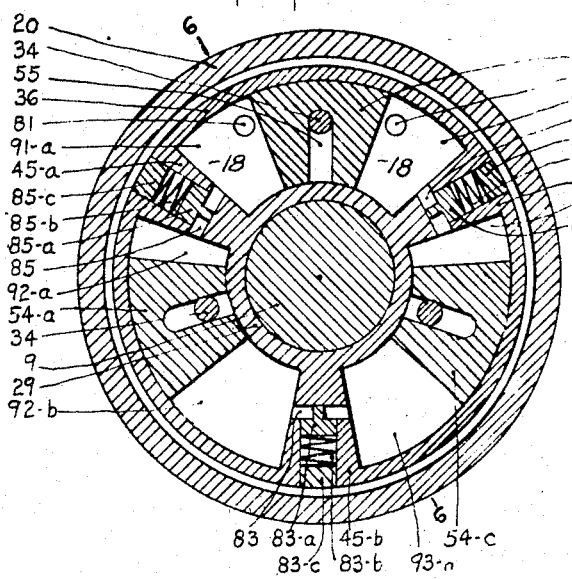
Figure 5 is a transverse sectional view taken approximately upon the line 5—5 looking in the direction indicated by the arrows.

The relief valves may be of any conventional type, but for the purpose of this description they may be of the two type way as shown on Figure 5.

As the members 54—a, 54—b and 54—c are reciprocated by the pins 34, they become in effect pistons.

It will be noted by reference to Figure 1, that the pistons move within the fluid filled enclosures of member 41 so that a small clearance remains at maximum displacements. Thus, when the members 54—a, 54—b and 54—c move toward the webs 45—a, 45—b and 45—c a pressure is given the enclosed fluid. Thus, pressure is created by power derived from the driving member 7 through the differential sets including the annular members 13—b and 14—b.

The resistance of the fluid against compression acts as a resistance to the clock-wise rotation of the gears 15—a and then through the teeth 79 to the clock-wise rotation of the member 14—b and thus the member 13—b to cause the gears 13—a and 14—a to tend to rotate the shaft 9 as clearly described in the above noted U. S. application, Serial No. 66,876.

Some of the compressing power derived from the member 7 will be transmitted to the webs 45—a, 45—b and 45—c to tend to rotate same clock-wise.

When the fluid pressure has reached a predetermined value the relief valves including the shiftable elements 83—a, 84—a and 85—a will be moved radially by the pressure so as to permit the fluid to escape to the adjacent chamber or low pressure side of the webs 45—a, 45—b and 45—c until the maximum displacement of the members 54—a, 54—b and 54—c is reached and the pressure again falls to the predetermined value.

As the speed of the driving member 7 is increased, the speed of the annular member 14—b relative to the member 41 is also increased and thus the interval of time for a rotation of the pin 34 is decreased and the time interval of a cycle of compressing movement of the members 54—a, 54—b and 54—c is decreased. Thus the compressed fluid has to be transferred from one chamber to another through the ducts 83, 84 and 85 in a shorter interval of time.

In applicant's U. S. Patent, Serial No. 2,143,711, issued January 10, 1939, it is shown that the resistance to the transference of a given amount of fluid from one enclosure to another (the orifices remaining constant in area) will increase proportional to the rate or frequency of such transference. Thus, the pressure created in the fluid is controlled by the setting of the relief values and thence by the difference in speed of the members 7 and 9.

As the speed of the driving member 7 is increased, the fluid pressure will increase after the relief valve is opened so that eventually (under normal operating conditions) the retardation of the members 13—b and 14—b and the pressure applied to the webs 45—a, 45—b and 45—c will be sufficient to overcome the load resistance of the member 9 to rotate same.

If the load resistance (torque) of the member 9 remains constant, the difference in speed of the members 7 and 9 will remain constant, but under normal driving conditions the load resistance of the member 9 will normally decrease as its speed increases. Thus, the fluid control pressure will also decrease as the frequency of fluid compression decreases.

With continued decrease in load resistance the speeds of the members 7 and 9 will approach each other and the necessary fluid pressure will decrease to the predetermined value.

As the members reach approximately the same speed, the valve elements will act to close the ducts 83, 84 and 85 and the members 7 and 9 will be in positive drive relation, one member driving the other against the static pressure created in the enclosed fluid.

If the oil leaks from one enclosure to the other, there will, of course, be a slow movement of the members 54—a, 54—b and 54—c. With proper construction and adjustment this leakage will be reduced to a minimum and approximately positive drive relations will be effected obviously at high efficiency, because there is little or no molecular friction in the liquid under these conditions, and all the rotatable elements of Figure 1 are rotating at the same or approximately the same speed about a common axis during a large percentage of the operating time. Thus, according to the present disclosure, I provide a highly efficient self-energizing control automatically deriving amplified control power from the driving member according to the resistance of the driven member and the speed of the driving member to affect and effect speed driving relations between the said driving and driven members.

The difference of speed between the members 7 and 9 will cause the members 54—a, 54—b and 54—c to reciprocate at a frequency proportional to this difference in speed.

Thus, the fluid control pressure will be built up to force the member 7 to drive the member 9 in a speed torque drive relation according to the load resistance.

In actual operation the speed-torque relations of the members 7 and 9 are changeable. Member 9 may be the driven member one instant, and member 7 the driven member the next instant.

When member 9 is the driving member (rotating clock-wise) the members 13—b and 14—b will be rotated counter clock-wise and the member 41 will rotate clock-wise with the member 9 and the members 54—a, 54—b and 54—c will be reciprocated as hereinbefore described, but at a faster frequency for the same difference of speed between the members 7 and 9 than when member 7 is driving. The control action will thus be more intense, but positive drive relations will be effected when the predetermined fluid pressure is reached because of the relief valve action.

The size and number of the elements of the differential sets may be varied, and the arrangement size and number of the control elements as 54—a, 54—b and 54—c may be varied to meet the requirements under which the device will be installed and operated in the manner of and for the purpose intended.

According to the present disclosure the percentage of the total power transmitted from the driving member 7 to member 9 through the control path including the fluid compressing elements decreases as the number of differential sets is increased. Thus, the controlling torque between the members 14—b and 41 may be very small compared to the torque between the members 7 and 9.

When the member 41 is keyed to rotate with the member 9 direct and positive speed drive relations may be effected between the members 7 and 9. When the key 31 is removed and the member 41 is held stationary to the casing 20 by means of the screw 76 extended into the locking slot 42 and the nut 75 tightened, overspeed drive relations may also be effected between the members 7 and 9.

This is true, because the member 14—b may be retarded to rotate clock-wise at a lower speed than the member 9. As the speed of the member 9 increases from rest, the clock-wise rotation of the member 14—b will decrease. When the speed of member 14—b has been reduced to the speed of member 7, then member 9 will be rotating at the speed of members 7 and 14—b.

When the member 14—b is retarded to rotate clock-wise at a lower speed than member 7, then member 9 must rotate faster than member 7 in order to maintain the differential relation of the rotatable elements of Figure 1 as hereinbefore described.

By Figure 6 there is shown a modification of the means of Figure 1 whereby the fluid may be cooled and the fluid control may be manually varied as a co-incidental function of the operation of the vehicle.

The member 41 is held stationary for this operation by the casing 20 as hereinbefore described, the end portion 18 may be provided with openings as 81 and 82 in the walls to receive fluid conducting pipes 81 and 85 leading from the oil enclosures.

The fluid is forced by compression from one enclosure to another through the valve 37 and the cooling pipe 43 by means of the pipes 80 and 85. Each set of enclosures associated with each of the members 54—a, 54—b and 54—c may be associated with a separate set of pipes 80, 83 and 43 and a valve 37. The common shaft 46 of one or more of these valves 37 is operatively connected to a vehicle control pedal 27 by means of the arm 24, rod 17 and connector pin 81a. The pedal 27 is provided with a conventional foot pad 28. The pedal 27 may be considered as a portion of the conventional braking or fuel supply control means of the vehicle upon which the present device is installed. The valve 87 is connected to the oil supply pipe 90 and the pipe portion 86 in turn is connected to the pipe 43. When the valve 87 is opened as by the handle 88 fluid may be added to the control device when required to maintain a required supply.

The relief valve elements 83—a, 83—b and 83—c may be rendered inoperative if desired by tightening down the adjusting screws 83—c, 84—c and 85—c so that the liquid cannot be forced through the ducts 83, 84 and 85.

The valve 37 may be set so as to be open when the brake or fuel supply means is in a normally inoperative position, or in the case of the fuel supply alone when the throttle is in an idling position.

In this event the oil would be pumped back and forth from one compression enclosure to another at a frequency determined by the difference of speed between the members. If the oil conducting means 37, 80, 43 and 85 are supplied at sufficient capacity, very little retardation will be imposed on the fluid and thus on the member 14—b.

As the brake or fuel supply means 27 is operated by the operator of the vehicle, the valve will be actuated accordingly and a resistance offered to the flow of the fluid. The retardation of the fluid flow and thus the member 14—b will thus be controlled as a coincidental function of the operation of the vehicle.

With the same actuation of the valve an increase in load resistance will cause an increase in frequency of fluid compression and thus a more intense fluid control action. Thus, the device is both automatically and manually controlled.

In conclusion, it will be understood that the present disclosure provides fluid control means for automatically effecting and affecting variable speed driving relations between a driving member and a driven member as a function of the load resistance of the driven member and the speed of the driving member. That this automatic functional operation may be further affected manually as a co-incidental function of the operation of the vehicle.

That fluid control means are provided for deriving a small portion of the power transmitted between two former members to control the variable speed-torque transmission of said power in an automatic manner.

The torque converting fluid control means are provided for increasing torque relations between elements of a slip-drive couple as the relative speeds of the said elements is increased, and at a faster rate than the relative speed increase.

That fluid drive control means are provided whereby fluid pressure may be employed in a more or less static manner to create a control that may be progressively amplified to cause one power member to drive another power member.

While I have shown and described and have pointed out in the annexed claims certain new and novel features of my invention, it will be understood that certain well known equivalents of the elements illustrated may be used, and that various other substitutes, omissions and changes in the form and details of the devices illustrated and in their operation may be made by those skilled in the art without departing from the spirit of my invention.

Having thus described by invention, I claim:

1. A torque converting device for connecting driving and driven members in variable driving relation, comprising drive sets axially disposed between said members for rotation about a common axis therewith, a fluid, a pump for said fluid including pumping elements operatively connected to the last axially positioned set, a first axially positioned set connected to one of the members, means including a fluid valve for conducting the fluid to and from the said pump and cooling same, and co-incidental vehicle control means operatively connected to the said valve to control the movement of liquid whereby speed driving relations may be effected and affected between said members as a co-incidental function of the relative manual operation of the said vehicle control elements in the operation of the vehicle.

2. In a torque converting device for connecting a vehicle driving member and a vehicle driven member in speed drive relation, including gear sets arranged to provide progressively divisible power paths between the members, a fluid medium, a pump for said fluid constituting a portion of the last power path division and arranged for deriving torque converting control power from one of the members according to the extent of the said power path division and the relative movement of the active pump elements, means associated with the said pump and operable with the said vehicle fuel supply control means for initiating and varying the control power deriving action of the pump, and further means separately operable with the vehicle brake control means for varying the control power deriving action of the said pump as the fuel control means remains inoperative.

3. A speed-torque converting device for effecting variable speed driving relation between a driving member and a driven member, comprising speed sets each connected to the driven member and to adjacent sets, one of the said sets connected to the driving member, a fluid, a compressing means for said fluid operatively connected to one of the sets for deriving speed-torque effecting control power from the rotation thereof, remotely controlled fluid barrier means operatively connected to the compressing means so as to variably limit the compressing action and thus the derived control power independently of the difference in speed of the members, and means associated with the remotely controlled means for replenishing the fluid.

4. A torque control amplifying device for affecting the speed driving relation of driving and driven members of a vehicle provided with vehicle braking and fuel supply control means, including speed drive units axially disposed between said members, a fluid and an actuator for same connected to one of the sets and one of the members for deriving torque amplifying power from the rotation thereof, and relief valve means for controlling the action of the actuator as a function of the load resistance of the driven member, said members, said sets and said actuator mounted for rotation about a common axis.

5. A control multiplying device for automatically connecting a driving member and a driven member in variable speed driving relation, comprising differential drive sets axially disposed between said members for rotation about a common axis therewith, a fluid medium, a pump for pumping said fluid medium including fixed elements and relatively moving fluid compressing elements connected to the last axially positioned drive set, a first axially positioned set connected to the other of the said members, liquid conducting means including a valve for conducting the fluid to and from the pump and cooling same, and co-incidental vehicle control means operatively connected to the valve whereby the pumping action may be varied as a co-incidental function of the operation of the vehicle control means in the operation of the vehicle.

6. A torque multiplying power actuated slip-clutch device for associating a driving member and a driven member of a vehicle, comprising associated gear sets each connected to the driven member and to each adjacent set, one of said sets connected to the driving member and a second set provided with fluid compressing elements energized by power derived from the driving member transmitted through the said sets, a liquid adapted to be compressed by the said elements, and co-incidentally actuated brake and fuel supply control means adapted to selectively vary the liquid compressing action whereby the speed-torque driving relations of the members will be a function of the combined effect of the load resistance of the driven member, the speed of the driving member and the co-incidental variation of the compressing action.

7. A torque multiplying power actuated slip-clutch device for associating a driving member and a driven member of a vehicle provided with braking and power supply means, comprising associated gear sets each connected to the driven member and to each adjacent set, one of said sets connected to the driving member and a second set provided with a liquid actuating element energized by power derived from the driving member through the said sets, a fluid positioned to be actuated by said element, and co-incidentally actuated brake and power control means adapted to vary the liquid actuating action of the element whereby the speed driving relations of the members will become a function of the combined effect of the load resistance of the driven member, the speed of the driving member and the actuation of the brake and power control means.

8. A torque amplifying device for affecting the driving relation of driving and driven members of a vehicle provided with braking and fuel supply means, including driving units disposed between said members, a fluid compressing couple including a fixed element and an element mounted for relative movement with one unit, an end unit connected to one member, and all units connected to each adjacent unit and the other member, a fluid positioned to be energized by said couple, and means for co-operatively associating the fluid with the said vehicle brake and fuel supply means so as to co-incidentally vary the said energizing action of the couple as separate co-incidental functions of the operation of the fuel supply means or the braking means during the operation of the said vehicle.

9. A fluid speed-torque control amplifying device for automatically effecting speed drive relations between a driving member and a driven member of a vehicle provided with vehicle control means, comprising slip-drive gear sets axially arranged in a compound multiple series driving relation, a fluid and an actuating couple for the said fluid, said couple and said sets arranged with the said fluid in normal positive drive relation so as to derive power from the said driving member to overcome the said normally positive drive relation and thereby initiate said slip-drive action, and means including liquid conducting and controlling elements for associating the couple with the vehicle control means.

10. In a self-energizing torque converting device, the combination of a plurality of gears in drive relation, a fluid and actuating means for the fluid for causing the gears to approach the same movement about a common axis, said couple including a fixed element and an element mounted for movement with certain of the gears, automatic adjustable relief valve means for controlling the movement of the said fluid when actuated, said valve set to normally act to restrain the said fluid, manually actuated elements for additionally controlling the actuation of the fluid by the couple, and means for maintaining the supply of liquid.

11. In a gear control organization, the combination of a pair of rotors in driving relation, a fluid and associated control means comprising a fluid control pressure creating device, said fluid automatically co-operating with the said control means so as to form a normally positive drive clutch organization, and means connecting the control to the rotors so that the fluid control pressure will vary from the positive drive pressure at a faster rate than the variation of difference in speed of the rotors, all of said means mounted for rotation about a common axis.

12. In a device of the class described, the combination of driving and driven member in driving relation, a stationary member, and a fluid and associated fluid controlled slip-drive control means positioned between the members for causing the members to assume speed driving relations, said control including manually actuated means for varying the fluid control action as a co-incidental function of the supply of power to the members, and means for selectively connecting the control means to the said stationary member and the said driven member.

13. In a torque converting gear control organization, the combination of a pair of rotors in constant driving relation, a control comprising a fluid and a fluid pressure creating device including a normally closed automatic relief valve for causing the rotors to automatically assume a pre-determined speed driving relation as a function of the fluid pressure created due to the deterrent action of the valve, and remotely controlled means for augmenting the fluid pressure control action of the control independently of the action of the rotors and the action of the said valve.

14. In a rotor control, the combination of a pair of rotors in driving relation, a fluid, a normally closed fluid valve and an associated fluid pressure control energized by power derived from one of the rotors for causing the valve to open and the rotors to assume a slip drive relation, said fluid, said valve and said control normally coacting to automatically place the rotors in positive drive relation, and remotely controlled means for additionally affecting the fluid pressure control and thereby the said drive relations.

15. In combination with two rotatable power members in drive relation, of a normally positive fluid control couple including a fluid valve means actively disposed between said members and tending to compress a fluid thereby to actuate the valve slip-drive to cause the members to approach a given speed relation during excessive torque periods on one of the members, a fluid for said couple and remotely controlled manually actuated means for varying the fluid control action of the said valve and thereby the flow of the fluid in its slip-drive operation.

16. The combination of power members in differential drive relation, hydraulic control means including pressure transmitting and pressure actuated elements provided with a limited degree of relative rockable movement connected to said members to rotate about a common axis with same to mechanically and hydraulically receive therefrom the power to actuate said control as a function of the rockable movement, a fluid for said control elements, said control elements and said control being relatively stationary when coacting for causing the members to positively and hydraulically drive one from the other at a prefixed relative speed and relatively movable while permitting the members to assume a slip-drive relation.

17. In a torque converting rotor control organization, the combination of a pair of rotors in mesh drive relation, a fluid medium, pumping means for the said medium, said pumping means drive connected to both of the said rotors, means for controlling the flow of the said medium to and from the said pumping means, said flow control means including elements actuated by the medium due to fluid compression power derived from one of the rotors, all of said means mounted for rotation about a common axis.

18. In a speed-torque transforming drive control organization, the combination of a pair of rotors in differential drive relation, hydraulic means drive connected to the rotors for differentially deriving control power from same for normally causing one of the said rotors to positively drive the other, and further hydraulic means manually actuated for affecting the said control power deriving action of the said hydraulic means.

19. In a drive control device for vehicles equipped with fuel and brake control mechanisms, including a driving member and a driven member in toothed drive relation, a liquid, a pump for said liquid, said pump differentially drive connected to both of the rotors for deriving control power therefrom, and adjustable automatic relief valve means hydraulically associated with the said pump, said valve means operatively associated with the said fuel control mechanism for varying the control power deriving action of the pump, said valve means also operatively associated with the said brake control mechanism for also varying the said control power deriving action of the pump independently of the said fuel control means.

20. A speed-torque converting device for affecting variable speed drive relations between a driving member and a driven member in toothed drive relation, comprising a fluid means, compressing means for the said fluid, said compressing means operatively drive connected to the members for deriving fluid compressing control power from the rotation thereof, remotely positioned manually actuated fluid barrier means, and automatic compression controlled fluid barrier means, all of said barrier means operatively associated with the fluid compressing means and with each other, and means for conducting the said fluid to and from the compressing means and the said barriers, said conducting means arranged so as to be employed for cooling and replenishing the fluid.

21. A torque convertor control device for affecting and effecting the speed-torque ratio driving relation of driving and driven members of a vehicle provided with vehicle braking and fuel supply control mechanism, a fluid, an actuator for said fluid, said actuator differentially drive connected to the members to differentially obtain actuating power therefrom for compressing the said fluid, an automatic relief valve operatively associated with the actuator, a second valve operatively associated with the actuator and with the said brake and fuel control mechanism, and means for conducting the said fluid to and from the said actuator and the said valves.

22. A combined positive drive and speed torque converting fluid clutch mechanism for drive associating a driving member and a driven member of a vehicle constantly in tooth drive relation, liquid actuating elements drive connected to both of the members so as to differentially receive actuating power therefrom according to the speed of one of the members and the load resistance of the other member, a pressure controlled valve operatively associated with the said members by means of the elements, a liquid for the elements, and resilient means for causing the valve to control the liquid flow to and from the elements and thereby the bidirectional reception of the said actuating power from the said members.

23. In a torque converting drive control organization, the combination of a pair of rotors, a fluid, a fluid flow control means drive connected to the rotors, said control and said fluid operatively associated to automatically act as a positive drive clutch during intervals of normal torque drive relations between the rotors and thence automatically as a speed-torque converting mechanism during intervals of greater than normal torque drive relation between the said members.

24. In an automatic torque converting power transmission, the combination of a pair of rotors in drive relation, a fluid, a normally stationary actuator for said fluid, said actuator differentially drive connected to the rotors so as to differentially receive torque converting power therefrom, and an automatic fluid flow control for said fluid, said control normally inactive for normally restraining the fluid to cause same to act as a positive drive control medium, said control actuated by the fluid according to the difference in speed of the rotors to cause the said torque conversion.

HOWARD J. MURRAY.